(12) United States Patent
Fitzgerald et al.

(10) Patent No.: US 11,378,529 B2
(45) Date of Patent: *Jul. 5, 2022

(54) ANALYTICAL METHODS USING X-RAY ABSORPTION SPECTROSCOPY FOR QUANTIFYING OR EVALUATING METAL IONS IN A DENTIFRICE

(71) Applicants: Colgate-Palmolive Company, New York, NY (US); Northwestern University, Evanston, IL (US)

(72) Inventors: Michael Fitzgerald, Oakhurst, NJ (US); Iraklis Pappas, Pennsauken, NJ (US); Jean-Francois Gaillard, Evanston, IL (US); Marco Alsina Corvalan, Evanston, IL (US)

(73) Assignees: Colgate-Palmolive Company, New York, NY (US); Northwestern University, Evanston, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/137,039

(22) Filed: Dec. 29, 2020

(65) Prior Publication Data

US 2021/0116397 A1    Apr. 22, 2021

Related U.S. Application Data

(63) Continuation of application No. 16/219,521, filed on Dec. 13, 2018, now Pat. No. 10,908,099.

(60) Provisional application No. 62/599,824, filed on Dec. 18, 2017.

(51) Int. Cl.
*G01N 23/083* (2018.01)
*G01N 21/89* (2006.01)
*G01N 21/94* (2006.01)
*G01N 23/087* (2018.01)

(52) U.S. Cl.
CPC ....... *G01N 23/083* (2013.01); *G01N 21/8914* (2013.01); *G01N 21/94* (2013.01); *G01N 23/087* (2013.01); *G01N 2021/8918* (2013.01)

(58) Field of Classification Search
CPC .............. G01N 23/083; G01N 23/087; G01N 21/8914; G01N 21/94; G01N 2021/8918
See application file for complete search history.

(56) References Cited

U.S. PATENT DOCUMENTS

| | | | |
|---|---|---|---|
| 1,593,485 A | 7/1926 | George et al. |
| 2,562,488 A | 7/1951 | Fuchs et al. |
| 3,083,143 A | 3/1963 | Hans et al. |
| 3,095,356 A | 6/1963 | Moss et al. |
| 3,105,798 A | 10/1963 | Holliday et al. |
| 3,277,118 A | 10/1966 | Hans et al. |
| 3,282,792 A | 11/1966 | Fiscella et al. |

(Continued)

OTHER PUBLICATIONS

Addy et al., 1997, "Studies on stannous fluoride toothpaste and gel," J. Clinical Periodontology 24:86-91.

(Continued)

*Primary Examiner* — Blake C Riddick

(57) ABSTRACT

The disclosure contains a method of quantifying and/or evaluating metal ions in a dentifrice, wherein the method comprises subjecting the dentifrice to X-ray absorption spectroscopy (XAS), and wherein the XAS is used to measure and/or evaluate the metal ions in the dentifrice. Also disclosed are methods of selecting and screening for dentifrices based upon the evaluation and quantification of their metal ion content.

20 Claims, 4 Drawing Sheets

(56) References Cited

U.S. PATENT DOCUMENTS

| | | | |
|---|---|---|---|
| 3,914,404 | A | 10/1975 | Langer et al. |
| 4,022,880 | A | 5/1977 | Vinson et al. |
| 4,082,841 | A | 4/1978 | Pader et al. |
| 4,154,815 | A | 5/1979 | Pader et al. |
| 4,238,476 | A | 12/1980 | Harvery et al. |
| 4,325,939 | A | 4/1982 | Shah et al. |
| 4,418,057 | A | 11/1983 | Groat et al. |
| 4,419,342 | A | 12/1983 | Hayes et al. |
| 4,522,806 | A | 6/1985 | Muhlemann et al. |
| 4,568,540 | A | 2/1986 | Lane et al. |
| 4,656,031 | A | 4/1987 | Lane et al. |
| 5,004,597 | A | 4/1991 | Majeti et al. |
| 5,017,363 | A | 5/1991 | Suhonen et al. |
| 5,455,024 | A | 10/1995 | Winston et al. |
| 5,578,293 | A | 11/1996 | Prencipe et al. |
| 5,674,474 | A | 10/1997 | Fisher et al. |
| 5,690,912 | A | 11/1997 | Campbell et al. |
| 6,521,216 | B1 | 2/2003 | Glandorf et al. |
| 6,680,143 | B2 | 1/2004 | Thackeray et al. |
| 6,696,045 | B2 | 2/2004 | Yue et al. |
| 8,865,137 | B2 | 10/2014 | Morgan et al. |
| 9,918,914 | B2 | 3/2018 | Deckner et al. |
| 10,098,829 | B2 | 10/2018 | Fisher et al. |
| 10,123,953 | B2 | 11/2018 | Ramji et al. |
| 2018/0215627 | A1 | 8/2018 | Kinoshita et al. |

OTHER PUBLICATIONS

Cigala et al., 2012, "The inorganic speciation of tin(II) in aqueous solution," Geochimica et Cosmochimica Acta 87:1-20.

Dunlee et al., 2013, "Surface complexation and oxidation of Sn(II) by nanomagnetite," Environmental Science & Technology 47:12852-12859.

Ganss et al., 2015, "Impact of Sn/F pre-treatments on the durability of protective coatings against dentine erosion/abrasion," PLoS One 10:1-9.

Harries et al., 1986, "Analysis of the EXAFS spectrum of hydroxyapatite," Journal of Physics C: Solid State Physics, Institute of Physics Publishing 19(34):6859-6872.

Hefferen, 1963, "Qualitative and Quantitative Tests for Stannous Fluoride," Journal of Pharmaceutical Sciences pp. 1090-1096.

McDonald et al., 1976, "Crystallographic studies of tin(II) compounds. I. Crystal structure of tin(II) fluoride, SnF2," Inorganic Chemistry 15(4):762-765.

Ogaard et al., 2006, "A prospective, randomized clinical study on the effects of an amine fluoride/stannous fluoride toothpaste/mouthrinse on plaque, gingivitis and initial caries lesion development in orthodontic patients," European Journal of Orthodontics 28:8-12.

PeltierR et al., 2005, "Metal speciation in anoxic sediments: When sulfides can be construed as oxides," Environmental Science & Technology 39(1):311-316.

Pettine et al., 1981, "Hydrolysis of tin(II) in aqueous solutions," Analytical Chemistry 53:1039-1043.

Saravanan et al., 2012, "XANES studies of titanium dioxide nanoparticles synthesized by using Peltophorum pterocarpumplant extract," Physica B: Condensed Matter 503:86-92.

Schmidt et al., 2009, "Speciation and Mobility of Arsenic in Agricultural Lime," Journal of Environment Quality 38(5):2058.

Takatsuka et al., 2005, "X-Ray absorption fine structure analysis of the local environment of zinc in dentine treated with zinc compounds," European Journal of Oral Sciences 113(2): 180-183.

Xie et al., 2015, "Coupled Effects of Hydrodynamics and Biogeochemistry on Zn Mobility and Speciation in Highly Contaminated Sediments," Environmental Science & Technology 49:5346-5353.

ANALYTICAL METHODS USING X-RAY ABSORPTION SPECTROSCOPY FOR QUANTIFYING OR EVALUATING METAL IONS IN A DENTIFRICE

CROSS-REFERENCE TO RELATED APPLICATIONS

This application is a continuation of U.S. patent application Ser. No. 16/219,521 filed on Dec. 13, 2018, which claims priority to and the benefit of U.S. Provisional Application No. 62/599,824, filed on Dec. 18, 2017, the contents of each which are hereby incorporated by reference in their entirety.

BACKGROUND

Toothpaste often contain tin (Sn) and zinc (Zn) compounds to provide anti-microbial functions. Although the initial chemical forms of metals in toothpaste formulae are well established (e.g. $SnF_2$, $ZnO$), it is unknown if they remain as such in the final product. Changes on the original composition are the result of interaction with the many compounds present in toothpaste, including glycerol, abrasives, stabilizers, polysaccharides, and phosphates. Further changes in the chemical speciation of metals can occur when the paste is diluted by saliva inside the oral cavity.

X-ray absorption spectroscopy (XAS) is a powerful structural tool for probing the local coordination environment of metals in a variety of sample types. Briefly, XAS uses high energy X-rays (generated from a Synchotron radiation source) to excite the core electrons of a particular atom. The absorption profile provides information about the oxidation state, coordination geometry, and Angstrom-level distance to nearby atoms. XAS can be used regardless of physical state of the sample and does not require adulteration or preparation prior to analysis. XAS is commonly used in environmental sciences where metal speciation in crude environmental samples is of interest.

Currently, there is a need for a technique that allows for better analysis of metal ions in dentifrice formulations, as there may be a change in the formulations tested in a laboratory setting as compared to the final dentifrice formulation.

BRIEF SUMMARY

The Applicants have surprisingly found that it is possible to use X-ray absorption spectroscopy (XAS) detection techniques in order to analyze metal ions (e.g., stannous and zinc) in a dentifrice composition. This detection technique allows one to analyze the interactions of metal ions (e.g., tin, zinc) in a dentifrice which then can allow for optimizing these interactions to develop more efficacious formulations. X-ray absorbance spectroscopy is an extremely powerful tool to directly examine the speciation of metals in dentifrice without sample adulteration. Because the dentifrice can be directly examined, and not solely a slurry or preparation made in a laboratory setting that may not contain ancillary components that could effect metal ion speciation, the use of XAS has the potential to provide an improved analysis of metal speciation, for example, in a final dentifrice product.

Here, using X-absorption spectroscopy (XAS), thermodynamic equilibrium speciation, and ab initio calculations, in one aspect, the present invention provides the coordination environment of Sn and Zn in generic toothpaste and compound mixtures, in order to determine the chemical species that may affect the oral microbial community. Because it is an element-specific method, there is typically very little interference from ancillary constituents in complex mixtures. These properties make XAS an ideal tool to probe the speciation of tin and zinc in dentifrice.

In one aspect, the invention provides a method of quantifying and/or evaluating a source of metal ions in a dentifrice using XAS directly on the dentifrice. For example, in this aspect, XAS may be used to determine stannous and/or zinc speciation.

In another aspect, the invention provides a method of selection or screening for a dentifrice, wherein XAS is applied directly to the dentifrice to evaluate and/or quantify metal ion speciation, and wherein the dentifrice is selected for further production and/or commercialization based upon the determination of metal speciation from the use XAS.

In still a further aspect, the invention provides compositions which are obtained or developed using XAS on a tested dentifrice.

DETAILED DESCRIPTION

In one aspect, the present invention is directed to quantifying and/or evaluating the presence and speciation of a source of metal ions (e.g., Sn(II)) in a dentifrice. In one aspect the invention is directed to Method 1, a method of quantifying and/or evaluating a source of metal ions in a dentifrice (e.g., toothpaste), wherein the method comprises subjecting the dentifrice to X-ray absorption spectroscopy (XAS), wherein the XAS is used to quantify and/or evaluate the metal ions in the dentifrice.

For example, Method 1 comprises the following:

1.1 Method 1, wherein the method comprises the step of comparing the XAS results against an aqueous and/or mineral species standard, (e.g, complexes with fluoride, gluconate, phosphate, and hydrolysis products).

1.2 Method 1 or 1.1, wherein the method is used to predict the equilibrium distribution of a metal ion species (e.g., Sn (II) species).

1.3 Method of Method 1, 1.1, or 1.2, wherein the standard is derived from a Density Functional Theory (DFT) analysis.

1.4 Method of Method 1, 1.1, 1.2, or 1.3, wherein the metal ion species (e.g., Sn(II)) is oxidized prior to the use of XAS.

1.5 Any of the preceding methods wherein XAS can be run to determine the kinetics of speciation changes in a dentifrice (e.g., toothpaste).

1.6 Any of the preceding methods, wherein the structural components of the dentifrice are analyzed using a combination of XAS measurements, DFT and thermodynamic equilibrium calculations.

1.7 Any of the preceding methods, wherein the dilution and oxidation effects inside the oral cavity are measured based on the analysis of the dentifrice.

1.8 Any of the preceding methods, wherein an analytical result is obtained between 15 seconds to 10 minutes (e.g., 30 sec, 1 min, 5 minutes, 10 minutes).

1.9 Any of the preceding methods, wherein the XAS is used to determine the distribution of various agents about surface (e.g., whether or not the agents are uniformly distributed).

1.10 Any of the preceding methods, wherein the XAS is used in conjunction with a computer readable media.

1.11 Any of the preceding methods, wherein the dentifrice is toothpaste.

1.12 Any of the preceding methods, wherein the source of metal ions is selected from: stannous, zinc, potassium, magnesium, calcium, and combinations thereof.

1.13 Any of the preceding methods, wherein the source of metal ions is stannous.

Figure 3:
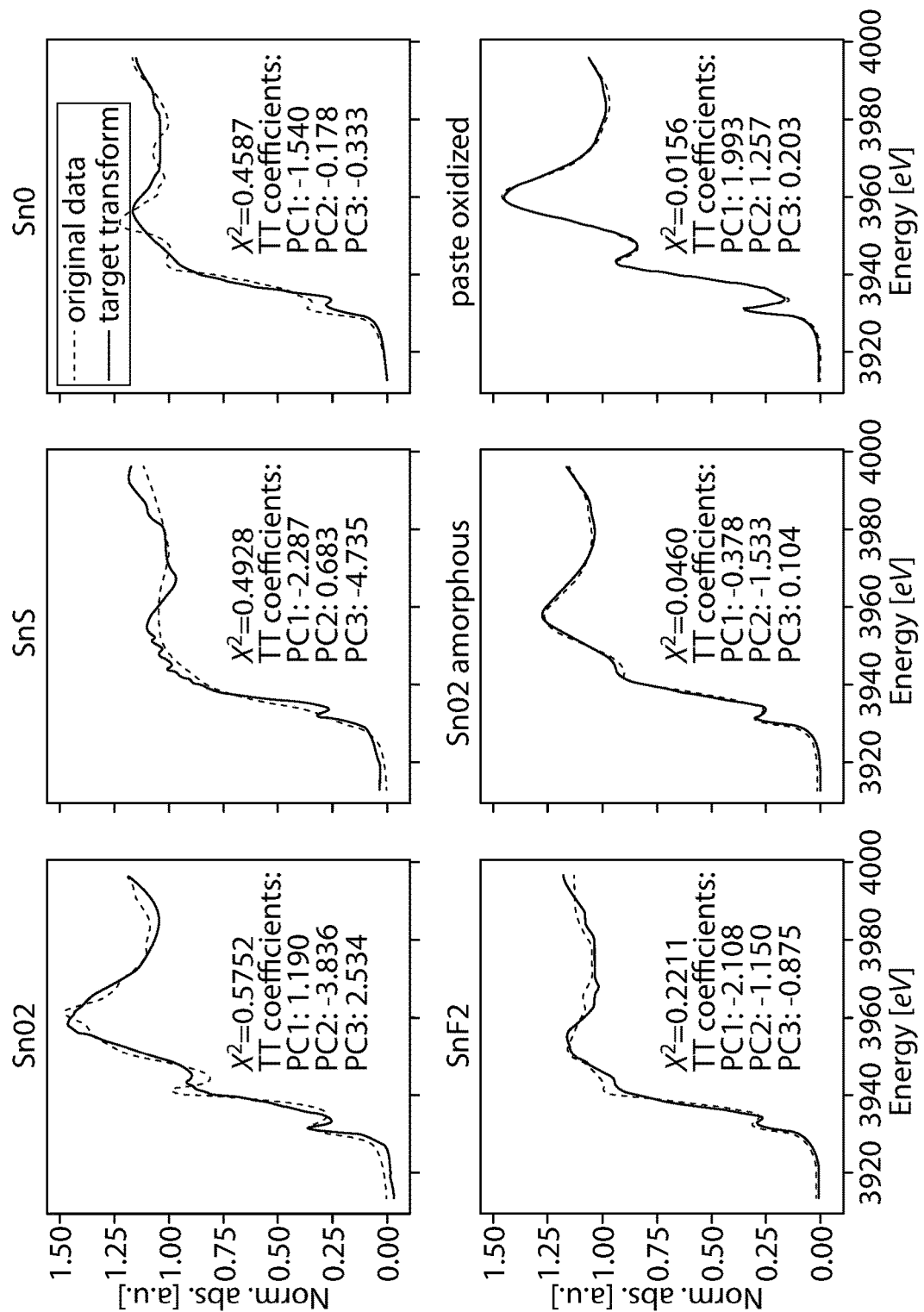
FIG. 3 provides attempts to fit known references using the principal components identified from the sample set.

1.14 Any of the preceding methods, wherein the standard used are the spectra is one or more taken from the spectra in FIG. 3.

1.15 Any of the preceding methods, wherein the quantification and/or evaluating comprises analyzing the percent speciation of the metal ion(s).

1.16 Any of the preceding methods, wherein the method comprises:
  a. subjecting the dentifrice to X-ray absorption spectroscopy (XAS);
  b. quantification and/or evaluation of the amount or percent of stannous speciation in the dentifrice;
  c. adjusting (e.g., increasing) the amount of free stannous (e.g., $SnF_2$) in the dentifrice.

1.17 Any of the preceding methods, wherein the method comprises:
  a. subjecting the dentifrice to X-ray absorption spectroscopy (XAS);
  b. quantification and/or evaluation of the amount or percent of $SnF_2$, bound tin, and $SnO_2$ in the dentifrice;
  c. adjusting (e.g., increasing) the amount of free stannous (e.g., $SnF_2$) in the dentifrice.

1.18 Any of the preceding methods, wherein the method comprises:
  a. subjecting the dentifrice to X-ray absorption spectroscopy (XAS);
  b. quantification and/or evaluation of the amount or percent of $SnF_2$, bound tin, and $SnO_2$ in the dentifrice;
  c. adjusting (e.g., increasing) the amount of free stannous (e.g., $SnF_2$) in the dentifrice. d. Optionally selecting a dentifrice for further production and commercialization (e.g., toothpaste) based upon the amount of free $SnF_2$ in the dentifrice.

1.19 Any of the preceding methods, wherein the method further comprises comparing the experimental spectra obtained from the dentifrice with a candidate reference standard.

1.20 Any of the preceding methods, wherein the speciation of metal ions is done using a PHREEQC version 3—A computer program.

In one aspect, the invention is directed to a toothpaste which is obtained after be analyzed with X-ray absorption spectroscopy according to any of Method 1, et seq.

In one aspect, the invention is directed to a method of screening dentifrices, wherein any of Method 1, et seq., are used to select a dentifrice for further production and commercialization. In one aspect, the dentifrice that is selected for further production and commercialization has increased amounts of $SnF_2$ relative to other dentifrices it is tested with, and/or a free $SnF_2$ reference standard.

"X-ray absorption spectroscopy" or "X-ray spectroscopy", as used herein, refers to the process where transitions are involved in absorption (XAS, X-ray absorption spectroscopy) or emission (XES, X-ray emission spectroscopy) of X-rays, where the former probes the ground state to the excited state transitions, while the latter probes the decay process from the excited state. Both methods characterize the chemical nature and environment of atoms in molecules, and synchrotron sources provide a range of X-ray energies that are applicable to most elements in the periodic table, in particular, those present in redox-active metallo-enzymes. The choice of the energy of the X-rays used, in most cases, determines the specific element being probed. This is quite a contrast with other methods, such as optical or UV absorption, fluorescence, magnetic susceptibility, electrochemistry etc., which have been applied to study biological redox systems. The results from infrared and Raman spectroscopy can be related to specific elements through isotopic substitution, but the analysis of such spectra for metal clusters can be complicated when the structure is not known.

"X-ray absorption near-edge structure (XANES)", as used herein, refers to spectra provide detailed information about the oxidation state and coordination environment of the metal atoms. The K-edge absorption edge energy increases with increasing oxidation state. In general, the rising edge position shifts when the effective number of positive charges (in a simplified view, oxidation state) changes resulting from 1 s core hole shielding effects. In an atom with one electron, for example, the electron experiences the full charge of the positive nucleus. However, in an atom with many electrons, the outer electrons are simultaneously attracted to the positive nucleus and repelled by the negatively charged electrons. The higher the oxidation state of the metal, the more positive the overall charge of the atom, and therefore more energy is required to excite an electron from an orbital. Conversely, the XANES spectrum shifts to a lower energy when there is more negative charge on the metal.

The dominant contribution to the K-edge spectrum comes from 1 s→np transitions, where np represents the lowest unoccupied p orbital of the absorbing atom. This transition, with $\Delta \iota = 1$ ($\iota$ is the orbital momentum quantum number), is quantum mechanically allowed and is typically intense. For transition metals with partially occupied d orbitals, additional insights can be gained by examination of pre-edge features that result from 1s to (n−1)d transitions. These are relatively weak in intensity ($\Delta \iota = 2$; hence, formally forbidden or dipole-forbidden), but they can be detected as they occur at energies slightly less than that of the main absorption edge. The pre-edge peak intensity increases when the ligand environment is perturbed from octahedral symmetry.

As used herein, the term "dentifrice" means paste, gel, or liquid formulations unless otherwise specified (e.g., toothpaste). The dentifrice composition can be in any desired form such as deep striped, surface striped, multi-layered, having the gel surrounding the paste, or any combination thereof. Alternatively the oral composition may be dual phase dispensed from a separated compartment dispenser.

In yet another aspect, the Method of any of Method 1, et seq, can be used to analyze chelating agents. For example, the method can be used to analyze the composition chelating or anti-calculus agents which are the soluble pyrophosphates. The pyrophosphate salts can be any of the alkali metal pyrophosphate salts. In certain embodiments, salts include tetra alkali metal pyrophosphate, dialkali metal diacid pyrophosphate, trialkali metal monoacid pyrophosphate and mixtures thereof, wherein the alkali metals are sodium or potassium. The salts are useful in both their hydrated and unhydrated forms. An effective amount of pyrophosphate salt useful in the present composition is generally enough to provide at least 0.1 wt. % pyrophosphate ions, e.g., 0.1 to 3 wt. %, e.g., 0.1 to 2 wt. %, e.g., 0.1 to 1 wt. %, e.g., 0.2 to 0.5 wt %. The pyrophosphates also contribute to preservation of the compositions by lowering water activity.

The methods according to the invention (e.g., any of Method 1, et seq) can be used to develop oral compositions for the care of the mouth and teeth such as dentifrices, toothpastes, transparent pastes, gels, mouth rinses, sprays and chewing gum.

As used throughout, ranges are used as shorthand for describing each and every value that is within the range. Any value within the range can be selected as the terminus of the range. In addition, all references cited herein are hereby incorporated by reference in their entireties. In the event of a conflict in a definition in the present disclosure and that of a cited reference, the present disclosure controls. It is understood that when formulations are described, they may be described in terms of their ingredients, as is common in the art, notwithstanding that these ingredients may react with one another in the actual formulation as it is made, stored and used, and such products are intended to be covered by the formulations described.

The following examples further describe and demonstrate illustrative embodiments within the scope of the present invention. The examples are given solely for illustration and are not to be construed as limitations of this invention as many variations are possible without departing from the spirit and scope thereof. Various modifications of the invention in addition to those shown and described herein should be apparent to those skilled in the art and are intended to fall within the appended claims.

EXAMPLES

Example 1

XAS spectra for all samples are collected without adulteration. Table 1 contains information regarding sample identities. The LIII-edge X-ray Absorption Near Edge Structure (XANES) region is used for spectral analysis. After collecting an XAS spectrum for each sample, 1 mL of 30% $H_2O_2$ is post-added to the sample, mixed thoroughly by hand, and an additional XAS spectrum is collected. It is believed that this procedure fully oxidizes all Sn(II) in the sample. In addition to toothpaste samples, a number of standards are analyzed. These standards are used in subsequent principal component analysis and target transformation (Test Formulations A-F).

TABLE 1

| Name | Description |
| --- | --- |
| Test Formulation A | Commercial anhydrous gel containing 0.454% $SnF_2$ |
| Test Formulation B | Commercial anhydrous dentifrice containing 0.454% $SnF_2$ containing 5% sodium tripolyphosphate |
| Test Formulation C | Commercial dentifrice containing 0.454% $SnF_2$ toothpaste containing >25% water, $SnCl_2$, and zinc citrate |
| Test Formulation D | 0.454% $SnF_2$ toothpaste containing >25% water and hopeite |

TABLE 1-continued

| Name | Description |
| --- | --- |
| Test Formulation E | Commercial dentifrice containing 0.454% SnF2 and sodium hexametaphosphate |
| Test Formulation F | 0.454% SnF2 toothpaste containing $Sn_2(P_2O_7)$ and <25% water |

Test Formulations A, B, C and E are commercial formulations. Principal component analysis (PCA) is first performed on the unknown samples. Once the principal components are identified, those components are used to fit the spectra of known reference standards. Reference standards with a good fit to the principal components ("Candidate References") are selected. Using the principal component ratios for each candidate reference, least-squares LCF is used to fit the experimental spectra and determine the sample composition relative to the candidate reference standards.

Figure 1:
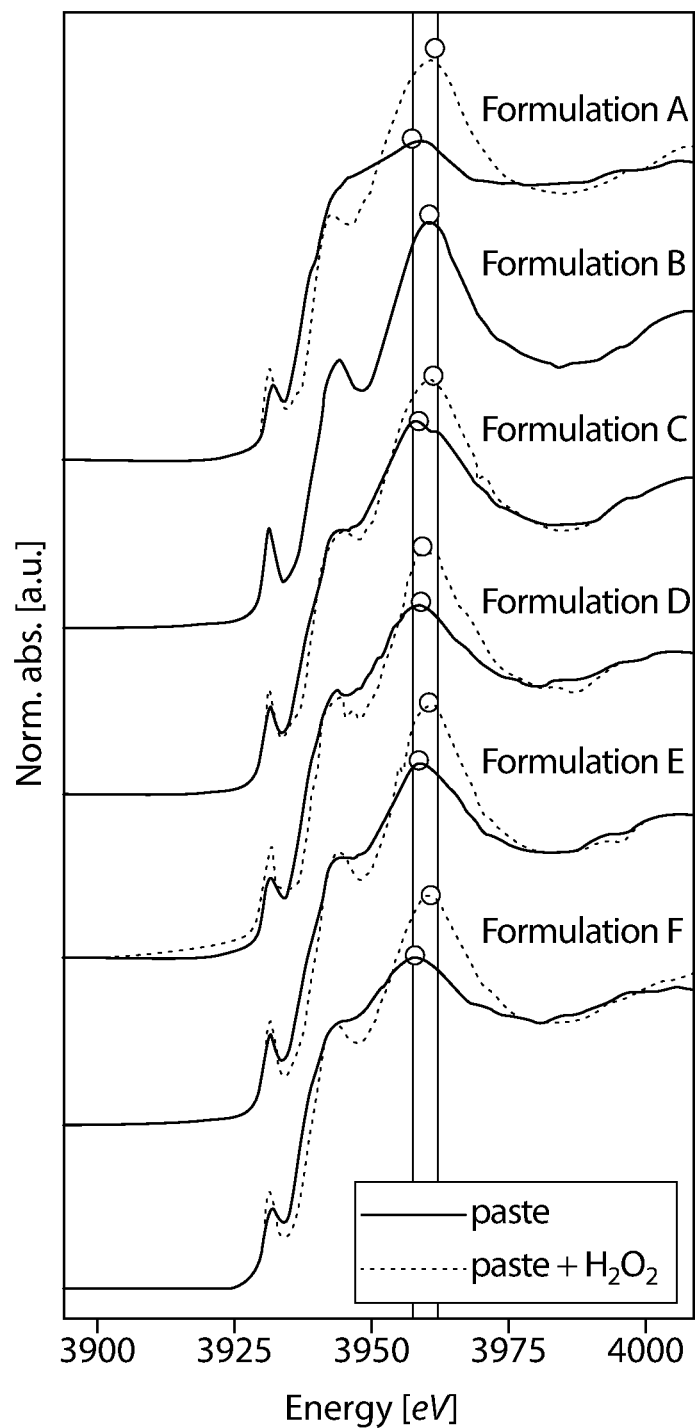
FIG. 1 is a XANES spectra of dentifrice samples analyzed (colored lines) and XANES spectra after the addition of $H_2O_2$.

FIG. 1 shows the normalized XANES region of the XAS spectrum for each test formulation toothpastes A-F (See, Table 1) before and after $H_2O_2$ addition. For all samples except Formulation B, the addition of $H_2O_2$ causes a dramatic change in the spectral features. The change in the spectra features are believed to be due to a change in the coordination environment about the tin metal center. The XAS spectra of all samples after oxidation are identical—this is believed to indicate that the Sn(IV) products after oxidation have similar coordination geometry and primary coordination sphere. Most likely, these oxidized complexes have octahedral geometry with oxygen or fluorine ligands in the primary coordination sphere.

Formulation B spectrum is not believed to change after oxidation. This lack of change after oxidation is believed to indicate that the stannous is chelated with strong ligands in an octahedral geometry prior to oxidation. This is consistent with test formulation B which contains 5% sodium tripolyphosphate (4.6:1 molar ratio of polyphosphate:Sn). Under conditions of excess polyphosphate, coordinatively saturated octahedral stannous complexes are believed to form.

Figure 2:
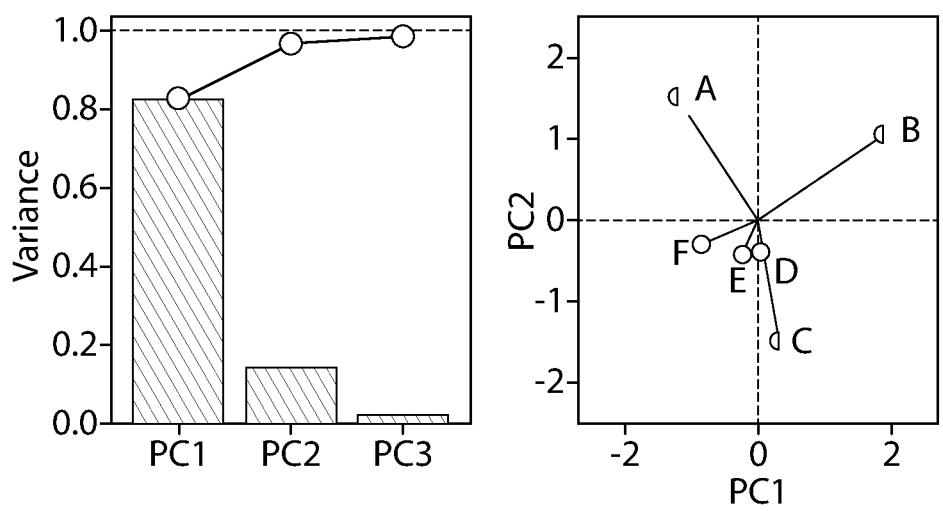
FIG. 2 is the output from principal component analysis of dentifrice samples used in this study. Left: contribution of each component to the explained data variance. Right: Projection of each sample in the component matrix.

Due to the complexity of the XANES spectra, principal component analysis (PCA) is the ideal method for spectral deconvolution. PCA is used to reduce complex sets of data to the minimum number of principal spectral components required to fit the data. Additionally, PCA applies a constraint that all components must be orthogonal, which prevents over-fitting. In the case of the experimental toothpaste samples, PCA revealed 3 principal components which explain 99% of the data variance. FIG. 2 shows the data variance assigned to each principal component and the projection of each sample in the component matrix.

After identifying the principal components, six known references are analyzed to determine whether the three principal components could be used to fit the spectra (FIG. 3). Of those six, the three reference standards with lowest $\chi^2$ values are chosen as the candidate references. Those three standards are: SnF2 (aq), amorphous SnO2, and the spectrum of the oxidized pastes.

The reference standard containing SnF2 is an aqueous solution, meaning that the sample contains a mixture of tetrahedral stannous complexes with hydroxide and fluoride ligands. This standard can be thought of as available stannous. The second reference is a standard sample of non-crystalline stannic oxide. The third reference is the average of the dentifrice spectra after oxidation. Since all samples convert to this same spectrum after oxidation, it is prudent to include this spectrum as a reference standard. This reference is best described as "chelated tin."

Figure 4:
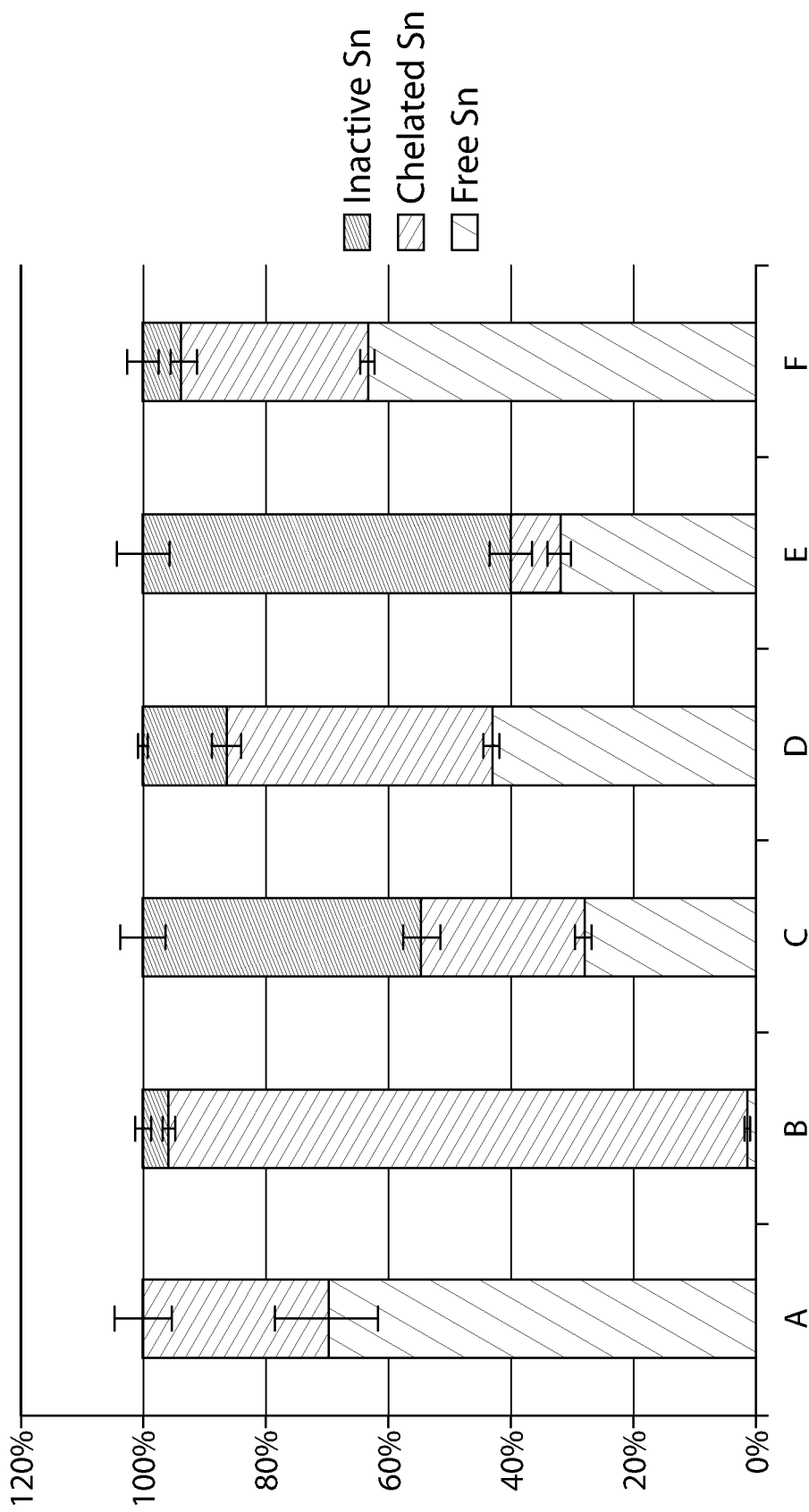
FIG. 4 provides experimentally determined speciation information for dentifrice samples after PCA and target transformation.

Once the reference standards are identified and the principal component ratios describing each reference are determined, the experimental toothpastes samples are analyzed using Least Squares LCF. Using this procedure, the composition of each dentifrice is determined. FIG. 4 and Table 2 demonstrate the percent speciation of Sn for each dentifrice relative to 100% Sn. The percent speciation value is not believed to be directly impacted by the total amount of tin in the formulation given that it is a relative percentage.

TABLE 2

|  | Available Sn | Chelated Sn | Inactive Sn | $\chi^2$ |
|---|---|---|---|---|
| Test Formulation A | 70.1 ± 8.40 | 29.9 ± 4.8 | — | 0.35 |
| Test Formulation B | 1.4 ± 0.17 | 94.4 ± 1.0 | 4.2 ± 0.10 | 0.016 |
| Test Formulation C | 28.30 ± 1.60 | 26.50 ± 3.00 | 45.30 ± 3.70 | 0.10 |
| Test Formulation D | 41.70 ± 1.30 | 45.20 ± 2.40 | 13.10 ± 0.30 | 0.09 |
| Test Formulation E | 33.60 ± 1.80 | 7.70 ± 3.40 | 58.70 ± 4.10 | 0.18 |
| Test Formulation F | 63.6 ± 1.2 | 30.0 ± 2.20 | 6.40 ± 2.70 | 0.15 |

Chelation of Zn is believed to inhibit bacteriological activity. If a similar trend is true for stannous, then toothpastes with higher amounts of "free SnF2" should display more efficacy. The results shown in FIG. 4 and Table 2 indicate the amount of "free SnF2" in Formulations A-F.

Formulation A contains the highest fraction of free SnF2. This is believed to be due to the presence of very few chelating agents in the formulation. Formulations C-F contains variable quantities of free SnF2.

It is also notable that Formulations C and E contains large fractions of SnO2 As discussed above, Formulation B contains primarily bound stannous, likely due to the presence of a high concentration of tripolyphosphate.

Based on an XAS analysis of six commercial and experimental products, the commercial Formulation A is believed to demonstrate the highest amount of available stannous. Experimental formulations Formulations D and F contain higher amounts of free stannous fluoride than Formulations B, C, and E. Of the two experimental formulations, Formulation F contains the most free stannous fluoride. This technique and the results can provide valuable data for product differentiation, tier differentiation, and prediction of clinical results.

The invention claimed is:

1. A method of quantifying and/or evaluating a source of metal ions in a toothpaste, wherein the method comprises subjecting the toothpaste to X-ray absorption spectroscopy (XAS), and wherein the XAS is used to quantify and/or evaluate the metal ions in the dentifrice;
wherein the metal ions are stannous or zinc.

2. The method of claim 1, wherein the method comprises the step of comparing XAS results against an aqueous and/or mineral species standard.

3. The method of claim 2, wherein the stannous or zinc metal ion species are oxidized prior to the use of XAS.

4. The method of claim 3, wherein the metal ion species are Sn(II).

5. The method of claim 2, wherein the species standard are complexes with fluoride, gluconate, phosphate, and hydrolysis product.

6. The method of claim 1, wherein the method further comprises determining an equilibrium distribution of the stannous or zinc metal ion species.

7. The method of claim 6, wherein the metal ion species are Sn(II) species.

8. The method of claim 1, wherein a standard is derived from a Density Functional Theory (DFT) analysis.

9. The method of claim 1, wherein structural components of the toothpaste are analyzed using a combination of XAS measurements, DFT and thermodynamic equilibrium calculations.

10. The method of claim 1, wherein the dilution and oxidation effects inside an oral cavity are measured based on the analysis of the dentifrice.

11. The method of claim 1, wherein the XAS is used to determine a distribution of various agents about a surface.

12. The method of claim 1, wherein the XAS is used in conjunction with a computer readable media.

13. The method of claim 1, wherein the metal ions are stannous.

14. The method of claim 1, wherein the standard used is selected from one or more of: available stannous, non-crystalline stannic oxide, and chelated tin.

15. The method of claim 1, wherein the quantification and/or evaluating comprises analyzing percent speciation of the zinc or stannous metal ion(s).

16. The method of claim 15, wherein the metal ions are stannous.

17. The method of claim 1, wherein the method comprises:
  a. subjecting the dentifrice to X-ray absorption spectroscopy (XAS);
  b. quantification and/or evaluation of stannous speciation in the dentifrice;
  c. adjusting an amount of free stannous or zinc in the toothpaste.

18. The method of claim 1, wherein the metal ions are stannous, and wherein the method comprises:
  a. subjecting the dentifrice to X-ray absorption spectroscopy (XAS);
  b. quantification and/or evaluation of an amount or percent of SnF2, bound Sn(II), and SnO2 in the dentifrice;
  c. adjusting an amount of free stannous in the dentifrice.

19. The method of claim 1, wherein the metal ions are stannous, and wherein the method comprises:
  a. subjecting the dentifrice to X-ray absorption spectroscopy (XAS);
  b. quantification and/or evaluation of the amount or percent of $SnF_2$, bound Sn(II), and $SnO_2$ in the dentifrice;
  c. adjusting an amount of free stannous in the toothpaste;
  d. selecting a dentifrice for further production and commercialization based upon the amount of free $SnF_2$ in the dentifrice.

20. The method of claim 1, wherein the method further comprises comparing an experimental spectra obtained from the toothpaste with a candidate reference standard.

* * * * *